United States Patent [19]

Iseli et al.

[11] Patent Number: 4,519,474
[45] Date of Patent: May 28, 1985

[54] SAFETY BEADING

[75] Inventors: Jakob Iseli, Windisch; Hans-Hermann Pribnow, Nussbaumen, both of Switzerland

[73] Assignee: Invento AG, Hergiswil, Switzerland

[21] Appl. No.: 529,492

[22] Filed: Sep. 6, 1983

[30] Foreign Application Priority Data

Sep. 13, 1982 [CH] Switzerland ............... 5417/82

[51] Int. Cl.³ .................................... B60R 18/04
[52] U.S. Cl. ............................ 180/279; 180/277; 200/159 B
[58] Field of Search .......... 180/271, 274, 277, 279; 200/159 B

[56] References Cited

U.S. PATENT DOCUMENTS

| 3,308,903 | 3/1967 | Sobel et al. | 180/279 |
| 3,599,744 | 8/1971 | Satterfield et al. | 180/279 |
| 4,020,918 | 5/1977 | Houskamp et al. | 180/279 |

FOREIGN PATENT DOCUMENTS 1129915 10/1968 United Kingdom ............... 180/279

Primary Examiner—Joseph F. Peters, Jr.
Assistant Examiner—Kenneth R. Rice
Attorney, Agent, or Firm—Werner W. Kleeman

[57] ABSTRACT

With this safety beading or ledge the drive of, for example, a driverless transport vehicle can be switched-off on collision with an obstacle, and can be switched-on again after removal of the obstacle. The safety beading or ledge mounted along a shock-absorbing or impact edge of the transport vehicle is provided for this purpose with a plurality of similar contact elements which are disposed in series and touch one another at contact points in an elastically deformable, pre-stressed tube. During collision with an obstacle and deformation of the safety beading or ledge the contact elements perform a rocking movement against one another, whereby contact is interrupted and the drive is switched-off. After removal of the obstacle the elasticity of the tube effects a return into the initial position, whereupon the contact points again touch and the drive is switched-on again.

10 Claims, 4 Drawing Figures

SAFETY BEADING

BACKGROUND OF THE INVENTION

The present invention broadly relates to a new and improved safety beading or ledge which may be disposed along the shock-absorbing edges or closing edges of an automatically movable or driverless contrivance, and more specifically, to a safety beading arranged along the shock-absorbing edges of automatic vehicles or along the closing edges of automatically closing doors, wherein the safety beading comprises an electric switching arrangement which includes contact elements which are carried by elastically deformable insulating bodies.

Such safety beadings or ledge serve the purpose in automatically operating devices, for example in driverless transport vehicles, for factory or warehouse floor transportation or in automatic vehicle doors, to switch-off the drive upon contact with an obstacle, or to initiate a braking action.

Switching beadings or ledges, contact mats and similar arrangements are known which in principle consist of two electric conductors held apart elastically, in the form of metal bands, wires and the like, which upon impact with an obstacle are pressed together, thus to cause a short circuit-like increase in the current of a control circuit.

In such a safety device, as shown in German Published Pat. No. 2,719,438 for the closing edges of automatically operated vehicle doors, there is provided a signal generator which extends over the whole length of the edge, and which comprises two ribbon-like electric conductors, which in the inoperative condition are kept apart at a certain distance in an elastically deformable insulating body. The conductors are provided in the region of one end with a voltage source and with a drive control device, and in the region of the other end they are connected by way of a measuring resistance with one another, whereby a no-load or closed circuit is formed. If the signal generator is pressed together anywhere along its length the two ribbon-like electric conductors come into contact, which results in a change in the resistance of the no-load or closed-current circuit, whereupon, for example, the drive vehicle door is stopped by means of a relay.

In the safety device described above it can happen that because of the presence of corrosion or dirt no contact is made, so that the drive to the vehicle door is not switched-off. Since the switching device which switches-off the drive is activated as a result of an increase in the no-load or closed-circuit current, it is possible that, for example, in the case of a defective relay, switching-off also fails to take place.

SUMMARY OF THE INVENTION

Hence, with the foregoing in mind, it is a primary object of the present invention to provide a new and improved kind of safety beading or ledge which does not suffer from the aforementioned drawbacks and limitations of the prior art proposals.

Another and more specific object of the present invention aims at a new and improved safety beading or ledge which eliminates corrosion and dirt.

A further significant object of the present invention is to provide a safety beading which acts as a zero switch so that defects in the electric circuitry, for example a broken winding, can already be detected upon starting-up of the vehicle or door to be actuated.

Yet a further important object of the present invention and for the purposes of eliminating the aforementioned drawbacks and shortcomings is to provide a safety beading which is constructed in such a manner that the switching-off of the drive, upon impact or collision with an obstacle, is accomplished by opening a no-load or closed-current circuit and there is effectively precluded the corrosion and contamination of contact locations.

Now in order to implement these and still further objects of the invention, which will become more readily apparent as the description proceeds, the new and improved safety beading or ledge according to the present invention is characterized by the features that there are provided a multiplicity of contact elements which are disposed in series or in a line in an elastic pre-stressed tube or tubular member. These contact elements contact one another at contact locations or points thereof in their normal rest or inoperative position. Under the action of an external force, typically for instance upon collision with an obstacle, the contact elements perform a rocking or tilting movement in relation to one another at the corresponding locations of the tube or tubular member, so that the contact at such contact elements is interrupted.

The contact elements are always closed in the normal operating condition and are protected by the tubular member in which they are accommodated. Upon collision with an obstacle the drive circuit is switched-off by breaking the no-load or closed-current circuit, and corrosion and dirtying of the contact points is thus largely eliminated.

A further advantage of the invention resides in the fact that the switching arrangement provided for the emergency cutting-off of the drive functions as a zero or null switch, so that defects, such as for instance rupture of a winding, can be readily and positively ascertained already upon placement into operation of the contrivance which is to be driven.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
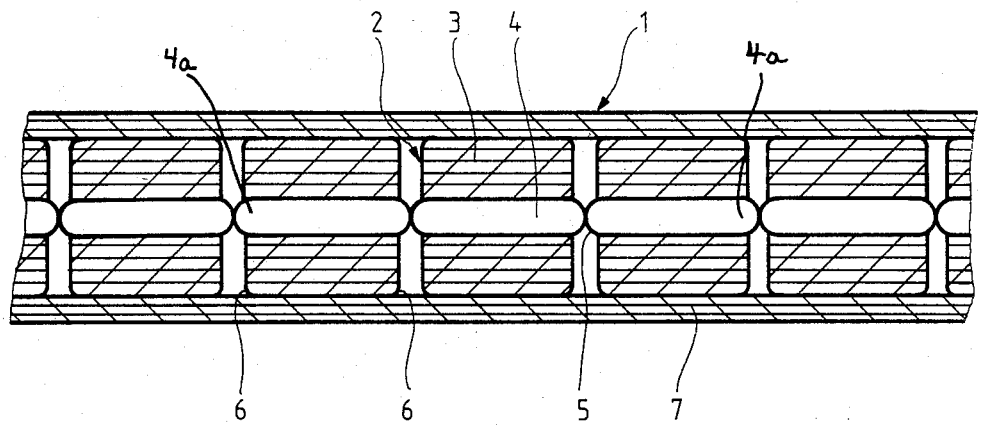
FIG. 1 is a longitudinal cross-section of an electric switching arrangement of a safety beading or the like constructed according to the teachings of the present invention in the normal inoperative or rest position.
Figure 2:
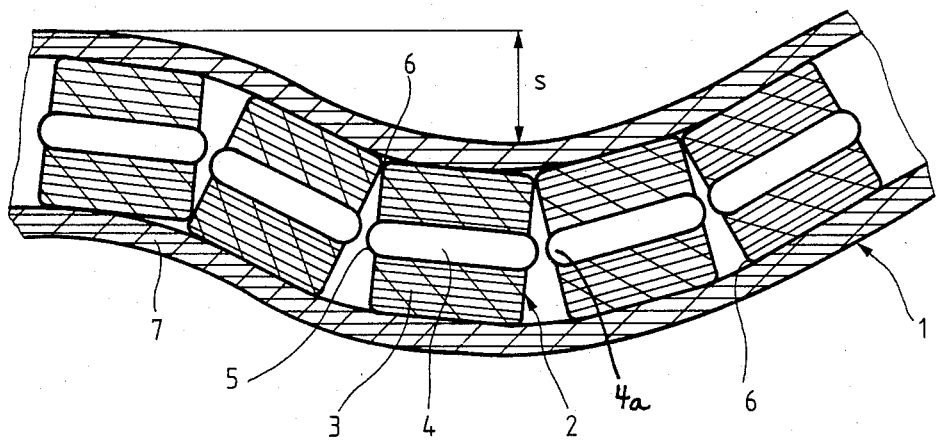
FIG. 2 is a longitudinal cross-section of the electric switching arrangement of the safety beading in its operative or work position.

Describing now the drawings, in the showing of FIGS. 1 and 2 the numeral 1 generally designates an electric switching arrangement for a safety beading or ledge or the like, as can be used as a collision interruptor device for driverless transport vehicles, for example employed in automatic factory or warehouse floor transportation installations.

The electric switching arrangement 1 is provided with a plurality of similar contact elements 2, which each consist of a substantially cylindrical insulating annular body 3 and of a contact rod or pin 4 having rounded ends 4a embedded therein. The rounded ends 4a of each contact rod 4 constitute contact points 5 and project on each side of the related insulating body 3 by essentially the same amount. The edges 6 of the cylindrical insulating bodies 3 are rounded-off for a purpose which will become apparent as the description proceeds. The contact elements 2 are arranged in a row or series in a tube or hose-like member 7 consisting of an elastically deformable material which is pre-stressed in its longitudinal direction and defining an insulating body.

Figure 3:
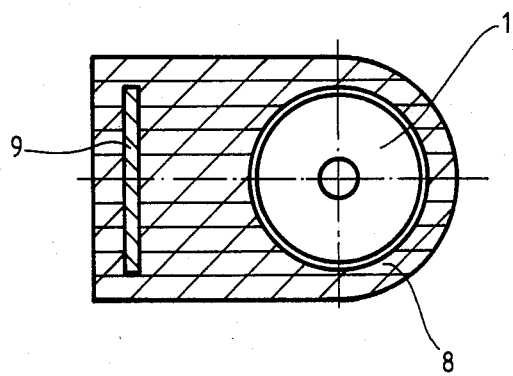
FIG. 3 is a cross-section of an entire safety beading according to the invention.
Figure 4:
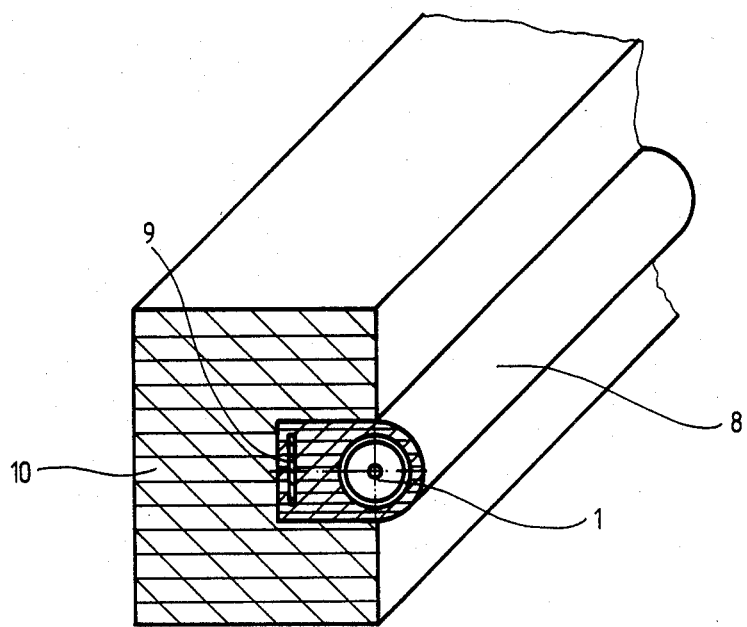
FIG. 4 is a cross-section of an application, shown by way of example, of a safety beading when disposed in a carrier made of foam material.

Referring now to FIG. 3 and FIG. 4, the electric switching arrangement 1 already described is embedded in a structural member 8 consisting of an elastically deformable material and likewise defining an insulating body. For the purpose of reinforcement a leaf or blade spring 9 or equivalent structure is provided running substantially parallel to the electric switching arrangement 1, which is also embedded in the structural member 8. In the application previously mentioned as a safety device in the case of collision, the safety beading or ledge 1, 8, 9 can, for example, be accommodated in a carrier 10 consisting of foam material which is mounted on the collision edge of any suitable and conventional driverless transport vehicle. In this way there is formed a safety bumper for such driverless transport vehicle.

The above-described safety beading or ledge operates as follows:

In its normal inoperative position (FIG. 1) the contact elements 2 are pressed together at the contact points 5 under the action of the pre-stressed tube 7, so that in a suitable control circuit, not shown, the winding of a circuit element is energized, and a contact thereof keeps the drive of the transport vehicle switched-on. Upon collision with an obstacle and with the deformation of the safety beading by an amount S (FIG. 2) the rounded edges 6 of the insulating bodies 3 meet and contact one another, so that the contact elements 2 perform a rocking or tilting movement with respect to one another, the contact points 5 are displaced accordingly, and contact is broken. The voltage in the control circuit falls to zero, so that its own contact opens and the drive is switched-off. Upon removal of the obstacle the elasticity of the tube 7 effects a return of the safety beading into its normal position, whereupon contact between the contact elements 2 is re-established and the drive of the transport vehicle is switched-on again.

Referring to FIG. 2, the amount S of the deformation at which the contact points 5 no longer touch each other can be determined by suitable choice of the dimensions of the contact elements 2. The relationship of length to diameter is the most important. If the safety beading is mounted in the form of an arc, the radius which may be achieved will also depend on this ratio.

Instead of forming the contact elements 2 and the tube 7 as a cylinder, it can also have a different cross-section, such as a quadratic or square one.

While there are shown and described present preferred embodiments of the invention, it is to be distinctly understood that the invention is not limited thereto, but may be otherwise variously embodied and practiced within the scope of the following claims. Accordingly,

What we claim is:

1. A safety beading which is arranged along the shock-absorbing edges or closing edges of an automatically movable contrivance comprising:
   an electric switching arrangement;
   said electric switching arrangement comprising a plurality of contact elements;
   each of said contact elements possessing a contact point;
   an elastic tube which is prestressed along its length;
   said contact elements being disposed in series in said elastic tube, so that the contact elements are pressed together at said contact points thereof when in a normal inoperative position by the action of the pre-stressing of the tube; and
   said contact elements comprise insulated edges which touch during the transition to an operative position under the action of an external force, whereby the contact elements perform a rocking movement against one another and contact is interrupted.

2. The safety beading as defined in claim 1, wherein:
   each contact element comprises a substantially cylindrical insulating body having edges which form said insulated edges and sides;
   each contact element further comprises a metal contact rod embedded in the cylindrical insulating body and having opposite ends; and
   the opposite ends of the metal contact rod projecting from the sides of the insulating body by the same amount and defining said contact points.

3. The safety beading as defined in claim 1, further including:
   a structural member;
   a leaf spring acting as a reinforcement for the safety beading; and
   said electric switching arrangement and said leaf spring being embedded in said structural member.

4. A safety beading for a driverless transport vehicle comprising:
   a series of contact elements arranged in longitudinal succession along the safety beading;
   each of said contact elements having contact means including contact points;
   resiliently deformable support means which in its non-deformed condition maintains said contact means on a predetermined line with said contact points on adjacent pairs of contact elements in contact for completing a vehicle power circuit through said contact elements along the entire length of the predetermined line; and
   the contact elements being shaped and dimensioned to tilt relatively to one another to break contact between the contact points of at least one pair of contact elements when the support means is deformed at any point along the line.

5. The safety beading as defined in claim 4, wherein:
   the support means is an elastically deformable, prestressed support tube surrounding the line of contact elements.

6. The safety beading as defined in claim 5, wherein:
   the contact elements are all similar and each comprise a central, electrically conductive contact rod surrounded by an insulating annular body fitting the inside of the support tube.

7. The safety beading as defined in claim 6, wherein:

the contact rods each have rounded ends defining said contact points projecting from the ends of the insulating annular body; and each said annular body has rounded edges on which said insulating annular body can rock on corresponding rounded edges of an adjacent insulating annular body when the support tube is deformed.

8. The safety beading as defined in claim 7, further including:

a structural member of elastically deformable material;

spring means reinforcing said structural member and tending to maintain said contact elements in said predetermined line; and said support means being embedded in said structural member.

9. The safety beading as defined in claim 4, further including:

a structural member of elastically deformable material;

spring means reinforcing said structural member and tending to maintain said contact elements in said predetermined line; and said support means being embedded in said structural member.

10. A safety bumper for a driverless transport vehicle, comprising:

a deformable carrier;

a safety beading carried by said carrier;

said safety beading comprising:

a deformable structural member;

a resiliently deformable support tube embedded in said structural member;

a spring means embedded in the structural member to maintain said structural member and the support tube embedded therein in a predetermined shape along its length; and a series of contact elements disposed in line within the support tube and in electrically conductive contact with one another to complete a vehicle power circuit only while the support tube is maintained in said predetermined shape.

* * * * *